United States Patent
Wu et al.

(10) Patent No.: US 11,644,566 B2
(45) Date of Patent: May 9, 2023

(54) SYSTEMS AND METHODS FOR SYNTHETIC APERTURE RADAR WITH VECTOR PROCESSING

(71) Applicant: NXP USA, Inc., Austin, TX (US)

(72) Inventors: Ryan Haoyun Wu, San Jose, CA (US); Jayakrishnan Cheriyath Mundarath, Austin, TX (US); Sili Lu, Austin, TX (US); Maik Brett, Taufkirchen (DE)

(73) Assignee: NXP USA, Inc., Austin, TX (US)

( * ) Notice: Subject to any disclaimer, the term of this patent is extended or adjusted under 35 U.S.C. 154(b) by 617 days.

(21) Appl. No.: 16/778,801

(22) Filed: Jan. 31, 2020

(65) Prior Publication Data

US 2021/0239827 A1 Aug. 5, 2021

(51) Int. Cl.
*G01S 13/90* (2006.01)
*G01S 7/288* (2006.01)
*G01S 13/931* (2020.01)

(52) U.S. Cl.
CPC .......... *G01S 13/9021* (2019.05); *G01S 7/288* (2013.01); *G01S 13/9005* (2013.01); *G01S 13/931* (2013.01); *G01S 7/2883* (2021.05)

(58) Field of Classification Search
CPC ............. G01S 13/9005; G01S 13/9017; G01S 13/9021; G01S 13/931; G01S 7/288; G01S 7/2883
See application file for complete search history.

(56) References Cited

U.S. PATENT DOCUMENTS

| | | | |
|---|---|---|---|
| 5,805,098 A | 9/1998 | McCorkle | |
| 6,492,932 B1 | 12/2002 | Jin et al. | |
| 7,940,376 B2 | 5/2011 | Harnisch et al. | |
| 8,344,934 B2 | 1/2013 | Ryland | |
| 9,261,593 B1 | 2/2016 | Mountcastle et al. | |
| 2011/0140954 A1* | 6/2011 | Fortuny-Guasch | G01S 13/9023 342/179 |
| 2014/0019679 A1* | 1/2014 | Zhu | G06F 9/3893 711/109 |

OTHER PUBLICATIONS

Chapman, William et al., "Parallel Processing Techniques for the Processing of Synthetic Aperture Radar Data on FPGAs", 2010 IEEE International Symposium on Signal Processing and Information Technology (ISSPIT), Dec. 15, 2010, pp. 17-22, IEEE, Piscataway, NJ, USA.
Fasih, Ahmed et al., "GPU-accelerated synthetic aperture radar backprojection in CUDA", 2010 IEEE Radar Conference, May 10, 2010, pp. 1408-1413, IEEE, Piscataway, NJ, USA.
Park, Jongsoo et al., "Efficient Backprojection-based Synthetic Aperture Radar Computation with Many-core Processors", 2012 International Conference for High Performance Computing, Networking, Storage and Analysis (SC), Nov. 10, 2012, pp. 1-11, IEEE, Piscataway, NJ, USA.
Wu et al, "Systems and Methods for Automotive Synthetic Aperture Radar", U.S. Appl. No. 16/668,772, filed Oct. 30, 2019, 24 pgs.

* cited by examiner

Primary Examiner — Timothy A Brainard

(57) ABSTRACT

Embodiments are disclosed that for synthetic aperture radar (SAR) systems and methods that process radar image data to generate radar images using vector processor engines, such as single-instruction-multiple-data (SIMD) processor engines. The vector processor engines can be further augmented with accelerators that vectorize element selection thereby expediting memory accesses required for interpolation operations performed by the vector processor engines.

17 Claims, 5 Drawing Sheets

SYSTEMS AND METHODS FOR SYNTHETIC APERTURE RADAR WITH VECTOR PROCESSING

TECHNICAL FIELD

This technical field relates to radar systems and synthetic aperture radar (SAR) systems.

BACKGROUND

Conventional automotive radar is constrained by the small physical size of antenna apertures due to available space and cost in many automotive solutions. A small aperture limits the angular resolution performance of the radar resulting in coarse pixel quality of images formed for targets detected using the radar. For some solutions such as autonomous driving applications, high precision radar imaging resolution is needed. For such applications, synthetic aperture radar (SAR) techniques have been used in prior solutions to obtain higher precision images. In SAR techniques, a successive number of data frames are collected from a moving radar, and these data frames are combined coherently to provide improved resolution. The SAR technique effectively provides an increased virtual aperture that is spanned by the radar in the moving vehicle.

Prior solutions have used back projection (BP) SAR processing to generate SAR images. Current BP SAR implementations require at least one set of transmit and receive antennas (assuming separate transmit and receive antennas are used) and a moving platform (e.g., a car) on which the SAR system is situated. A GPS (Global Positioning System) receiver and Inertial Measuring Unit (GPS-IMU) sensor is usually needed to estimate the exact position and velocity of the radar antenna when each radar chirp is being transmitted by the SAR system. The precise position information of the phase center of the radar antenna is then used to compute the range to a virtual point in the environment that is to be imaged. Usually a rectangular grid is virtually created to cover a rectangular area to be imaged, and each grid point is a pixel of a radar image to be formed. At the start of each transmitted chirp, the round-trip delay (RTD) representing the travelling time the chirp signal takes to travel (e.g., from the transmit antenna to a pixel and back to the receive antenna) is calculated, and a matched filter tuned to that RTD is applied to the received return radar signal. If a reflective target object is present in the pixel location, the matched filter outputs a strong signal with phase removed. If a target is absent at the pixel, the matched filter only outputs receiver noise. Because the matched-filter output has phase close to zero while noise signal has random phase, the target signal is added coherently over multiple chirps while the noise is added non-coherently. By accumulating the matched filter outputs over more and more transmit chirps for every pixel, an image of the entire radar scene can be formed with greater and greater clarity.

For automotive SAR systems, a linear chirp modulation (FCM) waveform is commonly used for transmit chirps, and the matched filter can be partially carried out in the analog domain using a chirp de-ramping mixer. The chirp de-ramping mixer functions to mix the transmitted chirp signal with the received echo return signal. The output of the analog mixer is then converted to digital samples in analog-digital converter (ADC) circuitry. In the digital domain following the de-ramping mixer and the ADC circuitry, a Discrete Fourier Transform (DFT) filter tuned to a particular range corresponding to each pixel is performed on the sampled data. Phase compensation is then applied to obtain the final matched filter output for that pixel, and its value is added to a corresponding element of an array representing the amplitude values of a pixel map of the image to be formed. The digital domain process repeats itself for all pixels and multiple chirps until a final radar image is constructed.

Conventional BP SAR systems, therefore, rely on matched filtering the received target echo data to a hypothesized range to each pixel under test. For radar solutions using linear frequency modulation (LFM) or linear chirp modulation (LCM) in frequency modulation continuous wave (FMCW) radars, the DFT computation is performed on the chirp data with respect to each pixel under test based on the range to the pixel. This matched-filtering processing sometimes includes range rate and direction as well. Because of the high cost of DFT computations, the DFT computations are usually substituted with lower cost techniques with interpolation conducted about some fixed-grid range data. These reduced precision techniques are usually achieved using oversampled Fast Fourier Transform (FFT) computations and nearest-cell interpolations, which in part leverages the algorithmic efficiency of FFT computations.

To achieve good performance, however, the oversampled FFT and nearest-cell interpolation approach requires that the output FFT vector to have a sufficiently fine grid resolution so that quantization error can be tolerated. This sufficiently fine grid resolution is commonly achieved by first zero-padding the original samples to over four (4) times to eight (8) times the original data length, and then applying the FFT on the zero-padded data. This zero-padding approach, therefore, requires the FFT to process data vectors that are multiple-times longer than the original data, and the computation burden is increased from $O\{N \log N\}$ to $O\{K \log K\}$ with an up-sampling factor of K/N where K is greater than N. If ASICs are used, this zero-padding approach also requires that the hardware FFT accelerators in the ASICs support data inputs with extended lengths, increasing the cost of such accelerators and making related solutions cost prohibitive for many applications. As one example for a mid-range radar with a 0.1 meter range resolution seeing up to 100 meters in range, the range spectrum is produced by FFT computations on 2000 fast-time real-channel samples that are zero-padded to 2048. In this case, the maximum FFT length will be 2048 samples. To use the same samples for SAR imaging in prior solutions, however, a times-8 (×8) over-sampling is required such that a 16 kilo-sample long FFT is needed. Because such long FFTs are usually not supported by hardware accelerators, lower oversampling factors must be used resulting in higher quantization error. As such, prior FFT solutions are impractical for many applications, such as automotive radar applications, due to computational complexity and device sizes required in these prior FFT-based solutions.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Systems and methods are disclosed for synthetic aperture radar (SAR) that process radar image data to generate radar images using vector processor engines. The vector processor engines can be further augmented with accelerators to expedite memory accesses required for vectoring operations performed by the vector processor engines. A variety of embodiments can be implemented and different features and variations can be implemented while still taking advantage of the techniques described herein.

Figure 5:
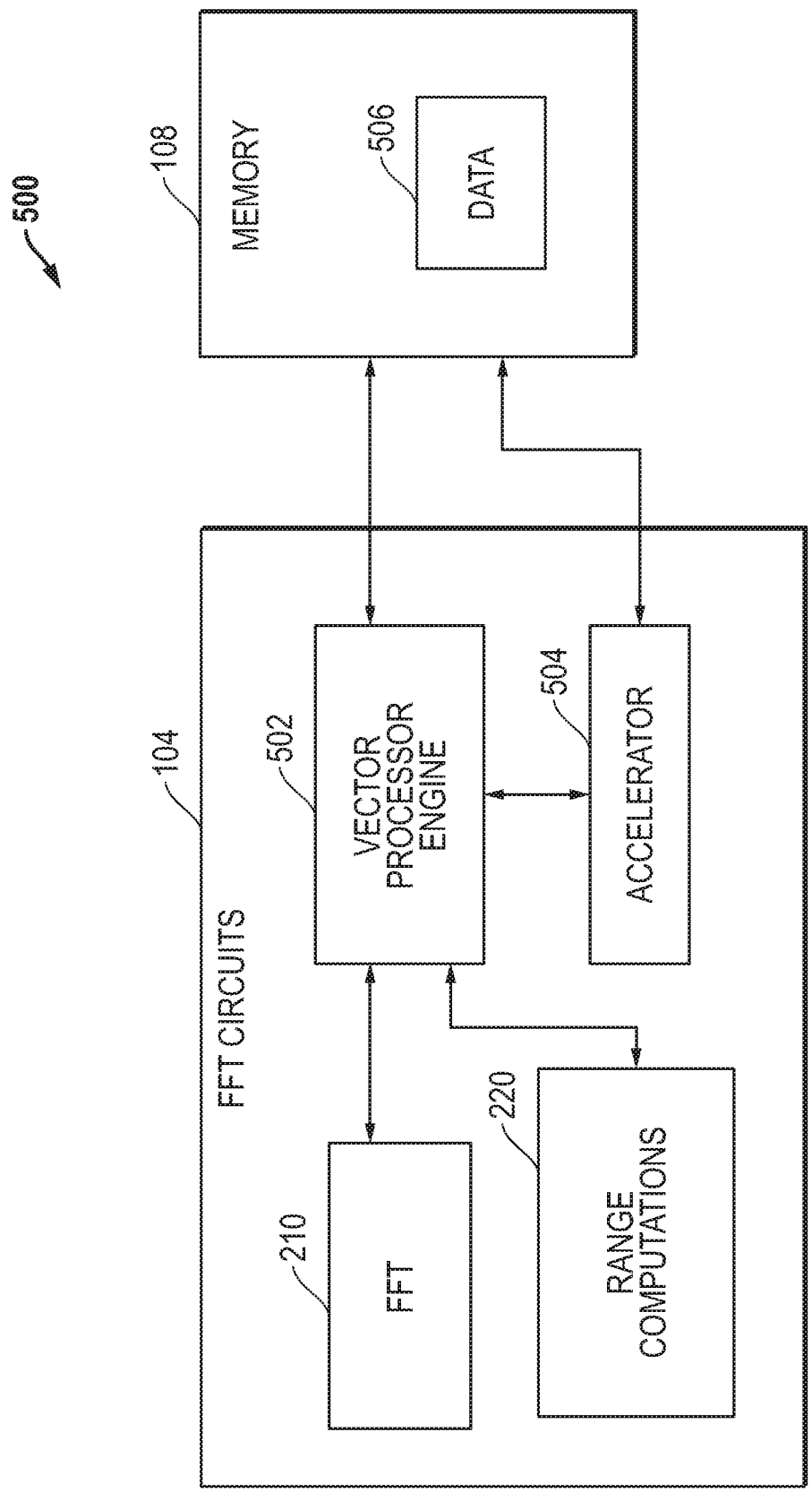
FIG. 5 is a block diagram of an example embodiment where vector processing logic is implemented by a vector processor engine to facilitate image data processing.
Figure 6A:
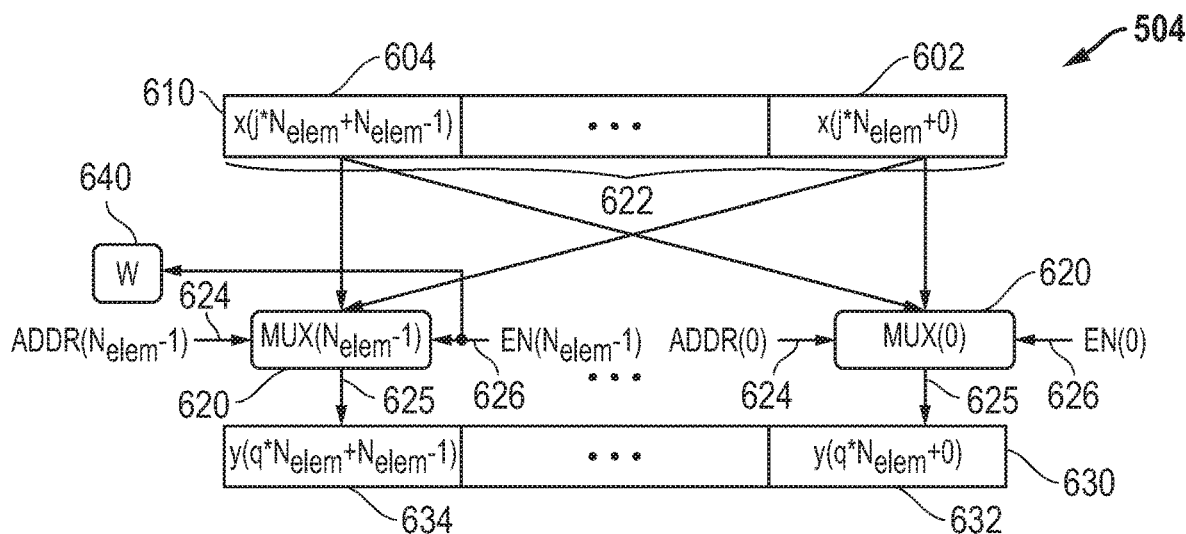
FIGS. 6A-6B provide example embodiments of an implementation for the accelerator in FIG. 5 that vectorizes the selection of data elements to facilitate the vector processing by the vector processor engine.
Figure 6B:
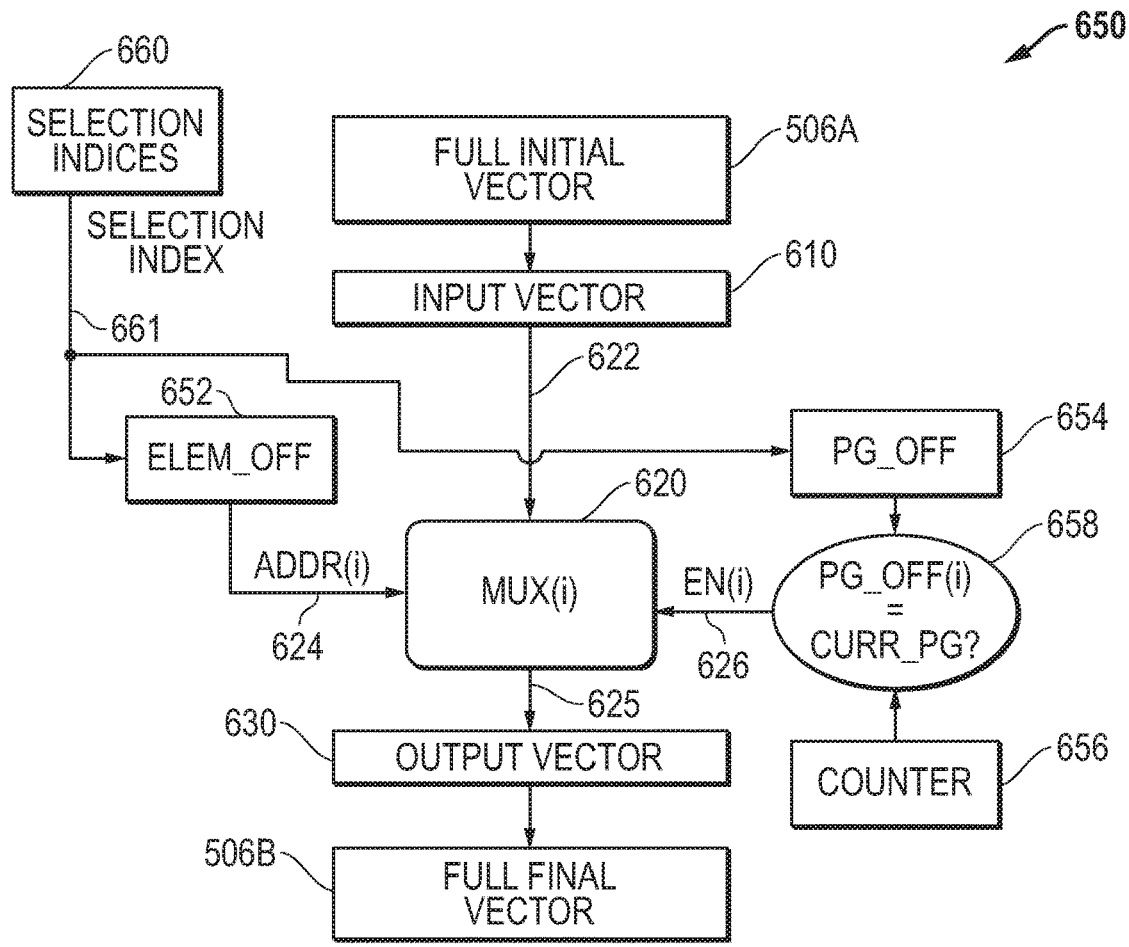

It is noted that FIGS. 1-4 provide example embodiments for a synthetic aperture radar (SAR) system that generates and processes radar image data to generate an output radar image. FIGS. 5 and 6A-6B provide example embodiments for a vector processor engine as well as an accelerator and related logic used for the vector processor engine.

As described above, the formation of SAR images typically requires that the relative motion between each antenna and any hypothesized point target, on which a pixel is to be constructed, to be precisely known. From this hypothesized range and range rate information, radar data across multiple frames is combined. If a target is indeed present at a hypothesized pixel position and has motion that matches the assumed motion, the energy of the echoes or returns radar signals for this target will add up coherently. On the other hand, if a target is not present at the pixel under test or has motion that does not match the assumed motion, only noise is added up in a non-coherent fashion. As such, over a number (X) of integrations, the signal-to-noise power ratio (SNR) will be enhanced by up to a factor of X, and an image is formed for the target that is indeed present. However, adequate resolution with FFT computations is achieved in prior solutions by zero-padding the original samples by four-times or eight-times or more. Unfortunately, these prior SAR solutions are computationally intensive and impractical for low-cost automotive radar applications.

The SAR processing described herein with respect to FIGS. 1-4 is implemented in an efficient manner making SAR solutions viable for a wider range of applications including low-cost solutions. The disclosed SAR systems in part leverage algorithmic enhancements as well as efficient system-on-chip (SoC) hardware accelerators to make SAR processing practical for a wider range of applications and open a new class of applications for automotive systems based on SAR imaging. For example, SAR techniques can now efficiently be applied to detailed environment mapping, parking assist, parking and autopilot, target classifications, advanced driver assistance system (ADAS) and autonomous driving (AD) functions, or other functions or applications that can take advantage of the SAR systems described herein.

As described further below, the disclosed SAR systems of FIGS. 1-4 significantly reduce the processing load of conventional back projection (BP) SAR processing and improve the quality of formed images. In one aspect of the disclosed SAR systems, a high-performance and high-efficiency interpolation approach replaces the conventional zero-padding FFT interpolators as well as interpolators such as linear interpolators, periodic Sinc interpolators, and the DFT interpolators. The improved interpolator techniques described herein can also be implemented using existing ASIC FFT accelerators without enlarging the maximum vector size requirement. In another aspect of the disclosed SAR systems, the computation of hypothesized ranges to the pixels under test is streamlined to achieve a much higher computational efficiency without any degradation in the performance. This streamlined range computation can also be implemented with parallel computing hardware cores to achieve high frame throughput. For example, parallel computing can be implemented using vector processors, single-instruction multiple data (SIMD) processors, multiple-instruction multiple data (MIMD) processors, general-purpose graphic processing units (GPGPUs), multi-core central processing units (CPUs), or other hardware processors or combinations of processors. The disclosed SAR systems achieve SAR processing with improved performance and higher efficiency as compared to prior solutions. As such, the disclosed SAR systems are useful in a wide range of applications and make SAR processing viable for low-cost automotive radar systems and applications.

Figure 1:
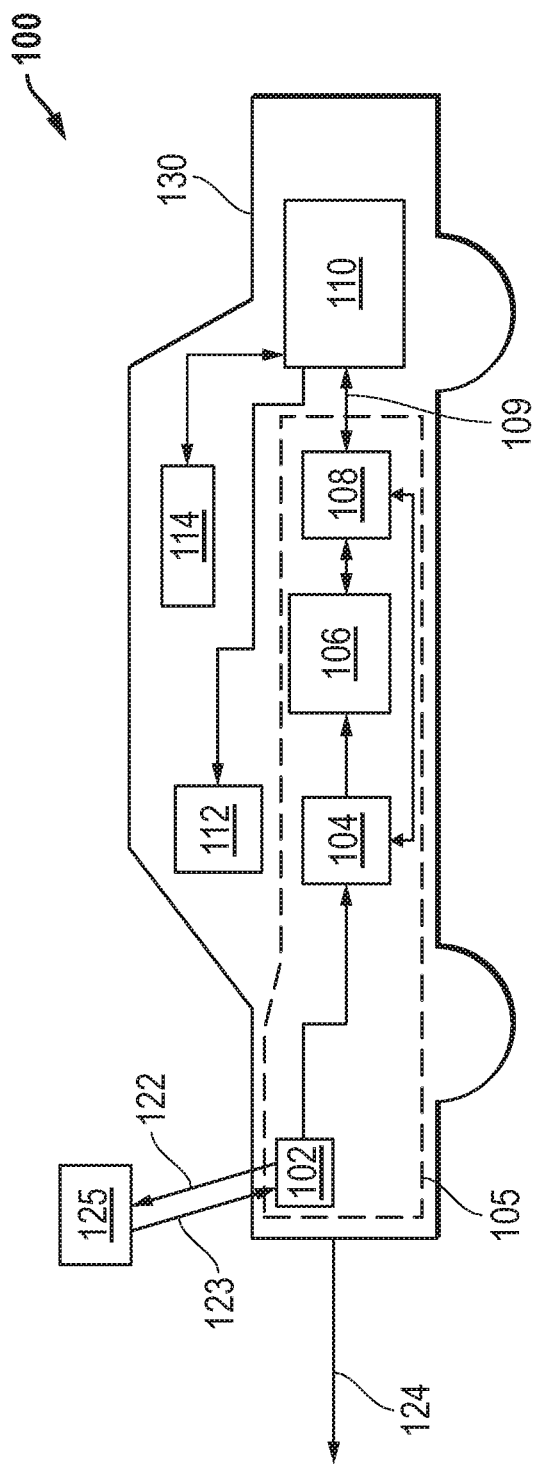
FIG. 1 is a block diagram of an example embodiment for a vehicle including a synthetic aperture radar (SAR) system that implements one or more of the techniques described herein.

FIG. 1 is a block diagram of an example embodiment 100 for a vehicle 130 including a SAR system 105 that implements one or more of the techniques described herein. For the example embodiment 100, the vehicle 130 is assumed to be moving in a one direction, as represented by arrow 124, and the imaging provided by the SAR system 105 is directed to one side of the vehicle 130. Multiple SAR systems 105 can also be included on the vehicle 120 to provide imaging for multiple different sides of the vehicle 130. The SAR system 105 includes front-end circuitry 102 that transmits radar signals 122, such as chirps, and captures return radar signals 123 that are reflected by an object 125. The front-end circuitry 102 preferably includes multiple antennas that transmit chirps and receive return signals as the vehicle 130 moves, and these antennas can be dedicated exclusively to transmit operations or receive operations in some solutions. The front-end circuitry 102 also includes mixing and analog-to-digital converter (ADC) circuitry to convert the return radar signals 123 into digital radar data that is sent to FFT circuits 104. These FFT circuits 104 can be, for example, ASICs that are programmed to implement the FFT interpolator functions described herein. The interpolated FFT data output by the FFT circuits 104 is received by the processor 106, and the processor 106 further processes the FFT output data to generate a radar pixel image 109 that is output by the SAR system 105. The memory 108 stores data for the FFT circuits 104 and the processor 106 including the final radar pixel image 109. For one embodiment, the radar pixel image 109 is output by the SAR system 105 to a navigation processor 110, which in turn outputs control signals for autonomous driving of the vehicle 130. For example, the navigation processor 110 can output these control signals to vehicle control systems 114, such as a steering system, an acceleration system, a braking system, or other control system or combination of control systems. For one embodiment, the navigation processor 110 outputs vision-based assistance images to a passenger or driver of the vehicle 130 through a display 112.

It is noted that one or more components of the SAR system 105 including the FFT circuits 104 and the processor 106 can be implemented using one or more application specific integrated circuits (ASICs), microcontrollers, microprocessors, programmable logic devices, or other programmable circuits that execute hardware instructions or program instructions stored in one or more non-volatile data storage mediums to carry out the functions described herein. In addition, the SAR system 105 can be implemented in whole or in part as a system-on-chip (SoC) integrated circuit. Further, the memory 108 and other memories used by the SAR system 105 can be implemented as one or more data storage mediums configured to store the data described herein. Other variations can also be implemented while still taking advantage of the adaptive sub-tile techniques described herein.

Figure 2:
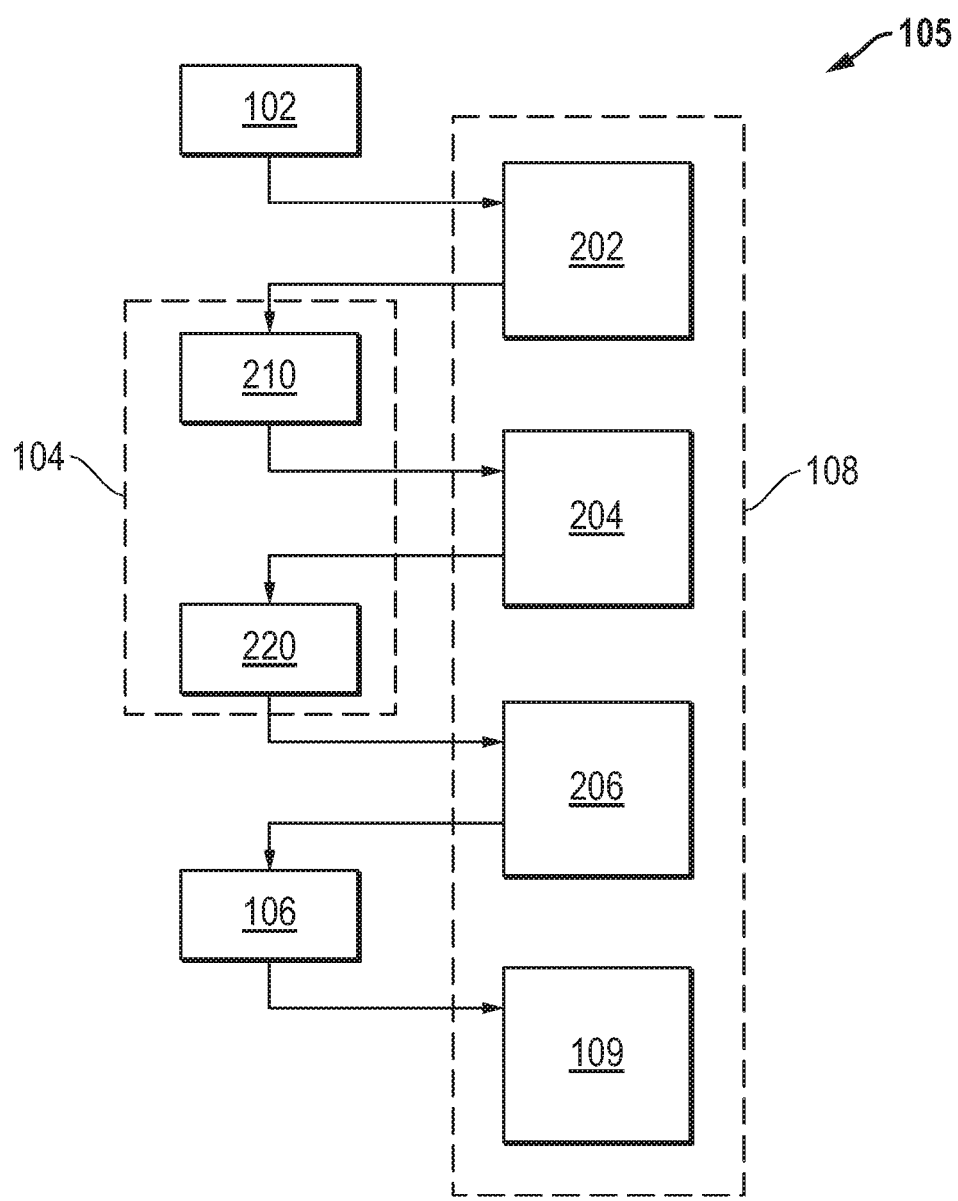
FIG. 2 provides an example embodiment for the SAR system and processing implemented by the SAR system.

FIG. 2 provides an example embodiment for the SAR system 105 and processing implemented using the FFT circuits 104, the processor 106, and the memory 108. As described above, the front-end circuitry 102 sends digital radar data 202 to FFT circuits 104. As shown in more details in FIG. 2, this digital radar data 202 can be stored within memory 108. For one embodiment, the digital radar data 202 is ADC cube data that represents multiple time samples of data collected over time for multiple antennas within the front-end circuitry 102. For example, the ADC cube data can represent a three-dimensional matrix of multiple chirps by multiple antennas by multiple samples over time. The FFT circuits 104 process the digital radar data 202 and generates FFT data 204, which can also be stored in memory 108. As described further below, the FFT circuits 104 implement FFT processes 210 that provide improved efficiency and performance. For one embodiment, the FFT data 204 is range cube data that represents oversampled range cells of FFT data representing pixels for a radar image. For example, the range cube data can represent a three-dimensional matrix of oversampled range cells of FFT data by multiple chirps by multiple antennas. The FFT circuits 104 also processes the FFT data 204 to generate interpolated FFT data 206. As described further below, the FFT circuits 104 can implement a streamlined range computation process 220 to facilitate pixel range determinations. For one embodiment, the interpolated FFT data 206 represents interpolated range cell data that represents an interpolation of multiple data elements from the FFT data 204 to form each cell of the range cell data. The processor 106 then processes the interpolated FFT data 206 to apply phase compensation and coherent integration and to generate the radar pixel image 109, which can also be stored in memory 108. The radar pixel data 109 is output for further use or processing, for example, by a navigation processor 110 as described above. The radar pixel data 109 represents a radar image captured by the SAR system 105. It is noted that memory 108 can be implemented as a single memory or as multiple different memories or registers that store the data being processed and generated by the SAR system 105. Other variations can also be implemented.

In operation, the SAR system 105 implements efficient radar image processing as described further below with respect to FIGS. 3-4. For example, as described with respect to FIG. 3, the SAR system 105 can implement a high-performance and high-efficiency FFT computation and interpolation processes that replaces conventional FFT interpolators. As described with respect to FIG. 4, the SAR system 105 can implement a streamlined range computation for image pixels. Other SAR processing can also be implemented while still taking advantage of the techniques described herein.

Figure 3:
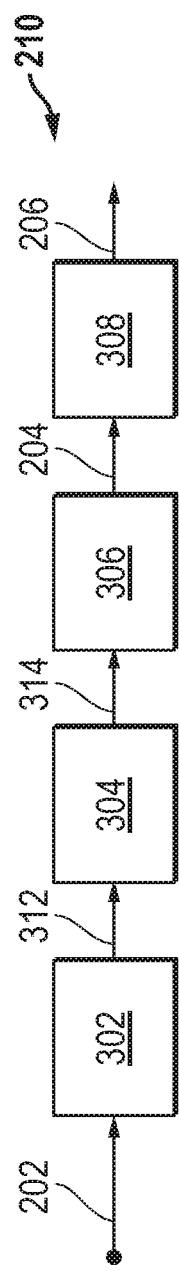
FIG. 3 provides an example embodiment for the high-performance and high-efficiency oversampled FFT processes performed by FFT circuits without using zero-padding.

Looking now to FIG. 3, an example embodiment is provided for the high-performance and high-efficiency oversampled FFT processes 210 performed by FFT circuits 104. In block 302, weights are applied to the signal samples from the ADC cube data 202 to generate weighted samples 312. In block, 304, a modulation application is applied to the weighted samples 312 to generate modulated samples 314. In block 306, a length-N FFT computation is applied to the modulated samples 314 to generate oversampled FFT data 204. As described further below, the length-N FFT computation does not use zero-padding and thereby reduces size and computation requirements. In block 308, the oversampled FFT data 204 is interpolated to generate interpolated FFT data 206, which is output to the processor 106 for further processing as described above.

In operation, the example embodiment of FIG. 3 provides an efficient implementation of an oversampled FFT nearest-cell interpolator. In practice, the sufficiently (e.g., ×4, ×8) oversampled FFT implementation results in negligible quantization error, and the performance is comparable to that of the ideal DFT interpolator or a full-sample periodic Sinc interpolator. In contrast with conventional oversampling FFT solutions that require zero-padding such that the length of FFT is prolonged, the embodiment of FIG. 3 provides an alternative implementation that does not use zero-padding for the length-N FFT computation in block 306.

The alternative SAR processing and efficient FFT interpolators described herein are based on the following formulations. For the case of weighted oversampled FFT of $\{x_n\}$ that evaluates the following DFT expression:

$$Y_k = \sum_{n=0}^{N-1} w_n x_n e^{-j\gamma kn}$$

where $Y_k$ represents the FFT interpolated data; n=0, 1, ..., N−1; k=0, 1, ..., K−1; $\gamma=2\pi/K$; $w_n$ represents a weight value; and $x_n$ represents a sample value.

When K/N is an integer, the above equation can be evaluated by computing K/N instances of an N-point FFT operation and by combining their outputs thereby reducing the complexity from O(K log K) to O(K log N) and reducing the required FFT length from K to N. Further, denoting $$\eta = \text{rem}\left(k, \frac{K}{N}\right)$$

where η=0, 1, • • •, K/N−1, for a given k and η:

$$Y_k\big|_{\text{rem}(k,\frac{K}{N})=\eta} = \sum_{n=0}^{N-1} w_n x_n e^{-j\frac{2\pi}{N}\frac{k}{(\frac{K}{N})}n} = \sum_{n=0}^{N-1} (w_n e^{-j\gamma n\eta}) x_n e^{-j\frac{2\pi(k-\eta)}{K}n}$$

where $e^{-j\gamma n\eta}$ is the modulation term; $Y_k$ represents the FFT interpolated data; η represents the remainder of k divided by K/N; n=0, 1, N−1; k=0, 1, ..., K−1; $\gamma=2\pi/K$; $w_n$ represents a weight value; $x_n$ represents a sample value; and K, N, and K/N are integers with K>N. In general, K/N instances are needed for FFT computations for all K output samples of $Y_k$.

For an example of K/N=4 (such that η=0, 1, 2, 3), the 4 instances of the N-point DFT are:

$$Y_k = \sum_{n=0}^{N-1} w_n x_n e^{-j\frac{2\pi}{N}\frac{k}{4}n} = \begin{cases} \sum_{n=0}^{N-1} w_n x_n e^{-j\frac{2\pi}{N}\frac{k}{4}n} & \text{for } \text{rem}\left(k, \frac{K}{N}\right) = 0 \\ \sum_{n=0}^{N-1} \left(w_n e^{-j\frac{2\pi}{4N}n}\right) x_n e^{-j\frac{2\pi}{N}\frac{k-1}{4}n} & \text{for } \text{rem}\left(k, \frac{K}{N}\right) = 1 \\ \sum_{n=0}^{N-1} \left(w_n e^{-j\frac{4\pi}{4N}n}\right) x_n e^{-j\frac{2\pi}{N}\frac{k-2}{4}n} & \text{for } \text{rem}\left(k, \frac{K}{N}\right) = 2 \\ \sum_{n=0}^{N-1} \left(w_n e^{-j\frac{6\pi}{4N}n}\right) x_n e^{-j\frac{2\pi}{N}\frac{k-3}{4}n} & \text{for } \text{rem}\left(k, \frac{K}{N}\right) = 3 \end{cases}$$

where each instance is evaluated using an N-point FFT. Further, it is noted that $$\text{rem}\left(k, \frac{K}{N}\right)$$

represents the remainder (rem) of k divided by K/N.

The above formulas show the output (Y) of the process can be implemented using multiple shorter (i.e., fewer number of samples) DFT operations. More specifically, looking at the N elements of the output Y:Y[1], Y[2], . . . Y[K], . . . Y[K], the elements with indices k such that rem(k,K/N)=0 will form a group. The indices k such that rem(k,K/N)=1 will form another group, and so on. This continues to form a total K/N groups. Each of these K/N groups is computed using the DFT formula with the N-sample (x) as an input. Although the formula above is written using a DFT expression, it is recognized that FFT is simply a faster implementation of DFT, and it is understood that this DFT expression can be implemented using FFT operations. As such, the above process leads to K/N instances of N-sample FFT operations.

Looking back to FIGS. 2-3, the processing of the FFT processes 210 provide efficient oversampled FFT operation for a SAR system 105. Given N input samples within data 202, the complex weighting provided in block 302 can have a complexity of O{N}. The K/N-times oversampled FFT operation (K/N instances of length-N FFT) in block 306 has a complexity of O{K+K log N}. The subsequent nearest-cell interpolation and quantization in block 308 has a complexity of O{M}. The computing of the normalized range value ($\omega_m$) for each pixel has a complexity of O{4} or O{4M} for M pixels. The normalized range value ($\omega_m$) of the m-th pixel can be calculated as:

$$\omega_m = k_{m\_to\_Hz} \sqrt{(x_{\text{pixel}} - x_{\text{radar}})^2 + (y_{\text{pixel}} - y_{\text{radar}})^2}$$

where $k_{m\_to\_Hz}$ is a scaling constant converting meters to Hz according to the chirp de-ramp mixing effect; [$x_{pixel}$, $y_{pixel}$] are the pixel's x and y positions relative to a global frame of reference; and [$x_{radar}$, $y_{radar}$] are the antenna's x and y positions relative to a global frame of reference. For the above equation, it is assumed that the transmit and receive antennas are co-located, and this expression can be extended to cases where the transmit and receive antennas are not co-located.

Finally, phase compensation can have a complexity of O{M}. As a result, the total complexity amounts to O{N+K+K log N+5M}. It can be seen that if K(1+log N)<NM the efficient oversampled FFT approach described herein is more efficient than a traditional DFT-based approach. It can also be seen if K log N+K<K log K+M, the efficient oversampled FFT approach described herein is more efficient than a conventional oversampled FFT SAR approach where K samples are used. Because K is multiple times larger than N by definition and where M (e.g., number of pixel, a 200×200 image results in M=40,000) is usually much larger than K, the efficient oversampled FFT approach described herein is almost always more efficient.

In addition to the algorithmic improvement of the oversampled FFT processing provided by the FFT circuits 104, the FFT circuits 104 can be carried out in one or more ASIC-based N-point FFT accelerators. In contrast to the N-point FFT solution in FIG. 3, conventional implementation requires a K-point FFT that is many times larger than the N-point FFT technique describe herein. The relaxed requirement on FFT size makes the disclosed SAR systems practical for a wide range of solutions.

In addition to FFT computations, one main contributor to the computational complexity of prior SAR solutions is the calculation of pixel ranges. For example, when the number of pixels increases in a SAR solution, the pixel range calculations become a dominant factor increasing complexity in the computational requirements. In addition to reducing the complexity through the efficient oversampled FFT processes described in FIG. 3, complexity of the pixel range calculations can also be reduced using the technique described below.

Figure 4:
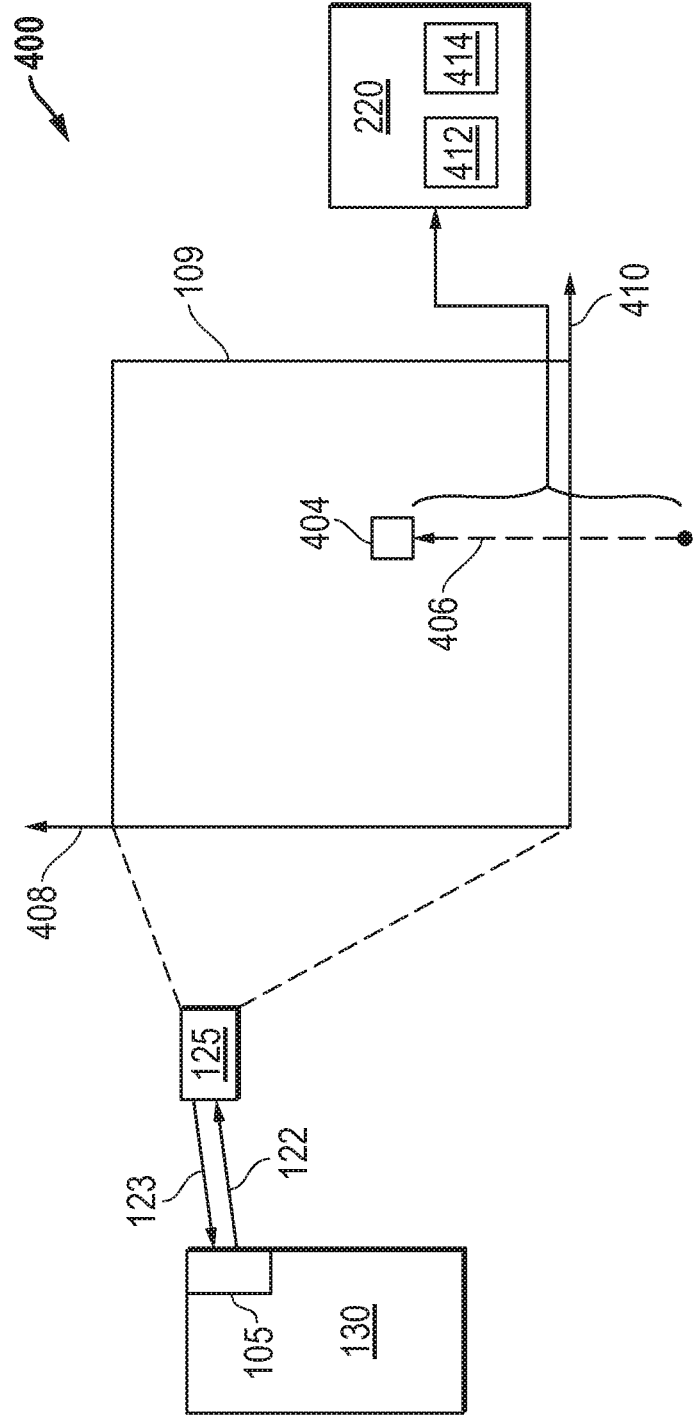
FIG. 4 provides an example embodiment where a streamlined range computation process is used to determine a range for each pixel within the radar pixel image being generated.

Looking now to FIG. 4, an example embodiment 400 is provided where streamlined range computation process 220 is used to determine a range 406 for each pixel 404 within the radar pixel image 109 being generated. The radar pixel image 109 is shown with respect to an x-axis 408 and a y-axis 410. The vehicle 130, which is moving, encounters an object 125 within a scene being detected by the SAR system 105. As described above, radar signals 122, such as chirps, are transmitted by the SAR system 105, and return radar signals 123 reflected by an object 125 are received by the SAR system 105. The SAR system 105 processes the return radar signals 123 to generate a radar pixel image 109 representing the scene being detected including object 125. The radar pixel image 109 includes an array of pixels 404, and a range 406 is determined for each pixel 404. The range 406 represents the hypothetical range from the vehicle 130 to a portion of reflecting object 125 represented by pixel 404. The range 406 for each pixel is determined using the range computation process 220. As described below, the range computation process 220 uses pre-computed x-axis components 412, pre-computed y-axis components 414, or both to achieve reduced computational complexity in determining the range for each pixel 404. These pre-computed x-axis and y-axis components 412/414 can be stored, for example, in the memory 108 or in another memory used by the SAR system 105.

Initially, upon the examination of the following simplistic range equation, it can be concluded that the complexity of the standard computation is O{$3M_xM_y$} for an SAR image consisting of $M_x$ horizontal positions and $M_y$ vertical positions.

$$\text{pixel range} = \sqrt{(x_{m_x} - X)^2 + (y_{m_y} - Y)^2}; \quad (m_x = 0:M_x-1, y_x = 0: M_y-1)$$

Looking again to FIG. 4, a geometric relationship exists between the pixel image 109 and the radar antennas within the SAR system 105. As an example, if the pixel image 109 is $M_x$ pixels by $M_y$ pixels and if $M_x$=200 and $M_y$=200, then the conventional range computation results in complexity of O{$3M_xM_y$}=120,000.

Upon a closer examination, it is noted for the disclosed embodiments that, if the imaged area is arranged in a rectangular grid fashion, the y-axis components (i.e., $(y_{m_y}-Y)^2$) in the square root of the range equation of a row are identical for all pixels on the same row. Likewise, the x-axis components (i.e., $x_{m_x}-X)^2$) in the square root of the range equation of a column are identical for all pixels on the same column. As a result, savings can be achieved by pre-calculating the x-axis components and storing them as x-axis components 412, pre-calculating the y-axis components and storing them as y-axis components 414, or both. The x-axis components 412 can be pre-calculated by computing the values for: $(x_{m_x}-X)^2$ for each x value from $m_x=0$ to $M_x-1$. The y-axis components 414 can be pre-calculated by computing the values for: $(y_{m_y}-Y)^2$ for each y value from $m_y=0$ to $M_y-1$. These pre-calculated x-axis and y-axis components 412/414 can then be re-used in pixel range calculations for pixels within the same column or the same row thereby reducing computational complexity. As a result, the complexity is reduced to $O\{M_xM_y+(M_x+M_y)\}$ for all pixels. Comparing to the prior example of $M_x=200$ and $M_y=200$, the complexity is reduced to 40400 from the original 120000. The saving becomes more and more significant with increasing values of $M_x$ and $M_y$.

In addition to the algorithmic enhancement of the pixel range determinations, the implementation of FIG. 4 can be further enhanced by applying parallel computing hardware resources. For example, the range computations can be parallelized by sending multiple values of a row to multiple hardware cores or components, such as ALUs (Arithmetic Logic Units) of a computing core, and loading each ALU with constant values of $-X$ and $(y_{m_y}-Y)^2$. Sequential instructions can then be performed that first perform an addition operation to compute "$x_{m_x}-X$", then perform a square operation to compute "$(x_{m_x}-X)^2$", then perform another addition operation to compute "$(x_{m_x}-X)^2+(y_{m_y}-Y)^2$", and finally perform a square root operation to compute the pixel range value "$\sqrt{(x_{m_x}-X)^2+(y_{m_y}-Y)^2}$". Arranging the computations using this formulation makes them amenable to easy implementation on any SIMD architecture.

It is noted that the radar position for the SAR system 105 is assumed to be changing at each chirp start due to the movement of the vehicle 130. As such, the pixel range computation is performed for each chirp. Because the processing is performed on a chirp-by-chirp basis, the movement of SAR system 105 does not need to be constant for the SAR processing to work. The radar position information is assumed to be estimated by a position sensor, such as a GPS-IMU sensor, and this position information is provided to the SAR system 105. Because the instruction and loaded constant values are identical to each of the multiple $x_{m_x}$ values fed to the vector of the ALUs, multiple pixel ranges can be computed within the same number of cycles that is required to compute a single pixel in a sequential fashion. For example, by utilizing a SIMD (single-instruction multiple data) processor or other vector processor, the computation throughput can be greatly increased. Likewise, the parallelization can also be carried out by other kinds of parallel computing resources such as a MIMD (multiple instruction multiple data) processor, a general-purpose graphic processing unit (GP-GPU), a multiple-core CPU, or other hardware cores.

It is further noted that combining the pixel range determination processes of FIG. 4 with the oversampled FFT processes of FIG. 3 provides further efficiency advantages and reduction in complexity. With the efficient oversampling FFT of FIG. 3, the order of complexity is reduced to $O\{N+K+K \log_2 (N)+5M\}$ not including the reduction in the pixel range computation. By replacing the conventional pixel range computation approach with the optimized pixel range computation of FIG. 3, the complexity is further reduced to $O\{N+K+K \log_2 (N)+(M_x+M_y)+3M\}$. As such, the combination provides a high efficiency and high performance solution for a SAR system that is practical for a wide range of applications including automotive radar systems and applications. Further, as described above, the SAR images can be displayed to a driver or can be sent to further automotive processing units to support autonomous self-driving functions or other advanced driver assistance functions.

As indicated above, example embodiments for SAR systems are described above with respect to FIGS. 1-4. Looking now to FIGS. 5 and 6A-6B, example embodiments are provided for a vector processor engine and accelerator that facilitate image data processing by the FFT circuits 104 within these SAR systems.

As indicated above, most of the mathematical operations above can be mapped conveniently on to a vector processor, such as a SIMD processor, by vectorizing along one of the $M_x$ or $M_y$ dimensions. One exception to this relatively easy vector mapping, however, is the selection of elements of the FFT based on an index derived from the calculated range for each pixel. As described below, this selection can be implemented by building a two-dimensional (2D) array in memory corresponding to the pixel grid. Each element can then be selected arbitrarily from a contiguously placed FFT output vector.

Conventional SIMD/MIMD/vector processors rely on a vectorized arrangement of the input data units in memory. That is, the input data vector is assumed to be in contiguous element units with widths corresponding to the size of the vector data path. However, the selection step in the algorithm as described above, stipulates grabbing data for a vector operation in a non-contiguous manner. Therefore, the bottleneck of implementation becomes the memory access step required to construct a vector to be consumed by the vector data path. A brute force selection algorithm would have a worst case computational complexity of $M_x*M_y$ because each element is arbitrarily accessed based on dynamically generated indices. The embodiment below describes an accelerator for the selection step that can attach to any SIMD/MIMD/vector processor engine to enable efficient selection of elements in memory based on a random selection index thereby reducing the computational complexity. In one embodiment, the worst case complexity can be reduced to $\min(M_x, M_y)*\text{ceil}(N/N_{AU})$ where N is the FFT size, where $N_{AU}$ is the width of the vector processor engine in number of ALUs, where the "min" function returns the smaller of $M_x$ and $M_y$, and where the "ceil" function returns the smallest integer that is greater than or equal to $N/N_{AU}$.

In selected embodiments, the accelerator exploits the non-decreasing or non-increasing property of the range for the pixels along one of the dimensions ($M_x$, $M_y$). The FFT outputs are loaded to the accelerator, one vector at a time. At each load, the logic selects the subset of the currently loaded vector that is required by the "next" indices along one of the pixel grid dimensions. Thus, per parsing of the entire FFT output vector (that is, a load of the whole FFT output vector from memory in $\text{ceil}(N/N_{AU})$ cycles), a number of elements equal to $\max(M_x, M_y)$ are selected, where the "max" function returns the larger of $M_x$ and $M_y$.

FIG. 5 is a block diagram of an example embodiment 500 where vector processing logic is implemented by a vector processor engine 502 to facilitate the image data processing described herein. The vector process engine 502 can be, for example, a SIMD processor engine or a non-SIMD vector processor engine having logic programmed to implement the vector processing described herein. The vector processor engine 502, for example, can be implemented as part of the FFT circuits 104 and can be used to facilitate the FFT processes 210 and the streamlined range computation process 220 described above. In operation, the vector processor engine 502 provides an efficient mapping of the above algorithms into the vector processing logic. For example, where an SIMD processor engine is used for the vector processor engine 502, a single instruction within the instruction set can be used to cause multiple similar operations to be performed thereby generating multiple data outputs for the single instruction. As further described herein, an accelerator 504 can be used to facilitate the vector processing provided by the vector processor engine 502. The vector processor engine 502 and the accelerator 504 are also coupled to the memory 108 to access and store data 506 related to the image processing described herein. For example, this data 506, which is processed by the vector processor engine 502 or the accelerator 504, can include the digital radar data 202, the FFT data 204, the interpolated FFT data 206, or other image related data being processed to generate the radar pixel data 109. For example, the vector processor engine 502 and the accelerator 504 can be used to facilitate the processing of the digital radar data 202 such as when the digital radar data 202 is ADC cube data representing multiple time samples of data collected over time for multiple antennas within the front-end circuitry 102 to form a three-dimensional matrix of multiple chirps by multiple antennas by multiple samples over time. Other variations can also be implemented.

FIGS. 6A-6B provide example embodiments of an implementation for the accelerator 504. FIG. 6A provides an example of the circuits and selection logic implemented by the accelerator 504 to vectorize the element selection thereby reducing computational complexity required by the vector processor engine 502. FIG. 6B provides a more detailed embodiment 650 for the multiplexers and related registers used within the accelerator 504.

FIG. 6A provides an example embodiment for the accelerator 504 including an input vector 610, an output vector 630, and multiplexers 620. The multiplexers 620 receive input data 622 from the input vector 610 that is selected by address inputs 624. The multiplexers 620 also receive enable signals 626. The output data 625 from the multiplexers 620 is used to generate the output vector 630. The enable signal 626 for the most significant (MS) multiplexer 620 is coupled to a register 640, and register 620 is used to indicate when the output vector 630 is full.

The N element input data set for the selection accelerator described herein (which is the output of the FFT operation) is partitioned into J pages where J=ceil(N/$N_{elem}$) and where each page has $N_{elem}$ contiguous elements. In each cycle of operation, a page of the input vector 610 is fetched from memory. The page offset represents the page currently loaded and corresponds to the MS (most significant) ceil(log 2(K)) bits of the load address. This input vector 610 includes a page of input elements from an input element 602 in the lowest location (LL) of the page to an input element 604 in the highest location (HL) of the page. The LL input element 602 represents the element x(j*$N_{elem}$+0), where $N_{elem}$ represents the number of elements in each memory row, and where j=0, 1, . . . ceil(N/$N_{elem}$)−1 with N representing the total number elements in the input vector 610 and j representing the page index. The HL input element 604 represents the element x(j*$N_{elem}$+$N_{elem}$−1). The number of multiplexers 620 is equal to $N_{elem}$ with a LL multiplexer 620 being designated MUX[0] and a HL multiplexer 620 being designated MUX[$N_{elem}$−1]. The LL multiplexer 620 receives the LL enable signal EN[0] and the LL address ADDR[0]. The HL multiplexer 620 receives the HL enable signal EN[$N_{elem}$−1] and the HL address ADDR[$N_{elem}$−1]. The HL enable signal EN[$N_{elem}$−1] is also stored in the register 640, which will transition when the HL enable signal EN[$N_{elem}$−1] is asserted. The output of the multiplexers 620 are stored in the output vector 630, which includes a range of output elements from a LL output element 632 to a HL output element 634. The LL output element 632 represents the element y(q*$N_{elem}$+0), where q=0, 1, . . . M/$N_{elem}$−1, and where M represents the total number of indices as described in further detail below. The HL output element 634 represents the location y(q*$N_{elem}$+$N_{elem}$−1).

FIG. 6B is an example embodiment 650 that provides additional details for the multiplexer 620 and related logic operations for the accelerator 504. For the embodiment 650, each selection index 661 from the selection indices 660 is partitioned into page-offset (PG_OFF) bits 654 and element-offset (ELEM_OFF) bits 652. The selection indices 660 can be a user-configured and ordered vector of selection indices where each selection index 661 is used to select an arbitrary subset of data elements from the input vector 610 to generate a continuous output vector 630 including the subset. The bits ($b_1$) for the ELEM_OFF bits represent $\log_2(N_{elem})$ of a selected number of least significant (LS) bits such that $b_1=\log_2(N_{elem})$. Where 16-bit indices are used, the bits ($b_2$) for the PG_OFF bits represent 16—ELEM_OFF of the most significant MS bits such that $b_2=16-b_1$. For one embodiment where $N_{elem}$ is 16, for 16-bit indices, $b_1$ is 4 and $b_2$ is 12. The input data 622 includes $N_{elem}$ elements from the input vector 610, and the input vector 610 is selected from the full initial vector 506A that is stored in memory 108. The output vector 630 includes $N_{elem}$ output data elements after processing be the MUX logic, and each output vector 630 is stored as part of the full final vector 506B in memory 108. A counter 656 (e.g., 16-bit) is used to maintain the page of the data vector currently loaded in the input vector 610, and the counter 656 outputs the current page (CURR_PG) to decision logic 658. The decision logic 658 compares the PG_OFF bits 654 to the current page from counter 656, and asserts the enable signal (EN(i)) 626 where there is a match. The multiplexer 620 (MUX(i)) receives this enable signal 626, is active when the enable signal 626 is asserted, and is inactive when the enable signal 626 is not asserted. The multiplexer 620 also receives the ELEM_OFF bits 652 as the address (ADDR(i)) 624. The output data 625 from the multiplexer 620 is stored as an element in the output vector 630. Effectively, when the EN[i] signal is asserted, the MUX[i] selects an input element from the currently loaded input vector 610 based on the ELEM_OFF value and writes it to the $i^{th}$ element of the output vector.

The input vector 610 is a subset of the N element full input vector sitting in memory. The idea is that in each cycle of operation, a new set of $N_{elem}$ of the N element vector is fetched, as represented by input vector 610, and the MUX logic is executed. Thereafter, the next set of $N_{elem}$ elements is fetched and so on. This process repeats until all F elements have been loaded and parsed. This will complete in N/$N_{elem}$ cycles.

During operation of the accelerator 504 as shown in FIGS. 6A-6B, the selection indices 660 are used to select an arbitrary subset of elements $N_{elem}$ from the full N element vector stored as the full initial vector 506A within memory 108. Each element within the input vector 610 can be, for example, 16-bit, 32-bit, or 64-bit elements. Thus, the data input vector (x) 610 includes $N_{elem}$ different 16-bit, 32-bit, or 64-bit elements. Other bit sizes can also be used. The index vectors ($p_1, p_2, \ldots p_K$) for the selection indices 660 each contain M 16-bit elements, and the indices in each of the K register "R_OUT" represents an output register that can hold $N_{elem}$ data elements within the data output vector 630. A 16-bit counter 656 maintains the current page (CURR_PG) of the data vector currently loaded into the input register (R_IN). The bit register (W) 640 signals that the output register (R_OUT) is full. The entire operation will complete within $\{N/N_{elem}+M/N_{elem}+M/N_{RAU}\}$ cycles.

TABLE

INSTRUCTIONS FOR EXAMPLE STATE MACHINE

| Instruction | Action |
|---|---|
| 1 | Initialize CURR_PG = 0, IND_PG = 0, LAST_PG = $N/N_{elem}$ −1 |
| 2 | Load [x($j*N_{elem}$ + 0), ..., x ($j*N_{elem}$ + $N_{elem}$ −1)] from DMEM to R_IN, where j = CURR_PG |
| 3 | Load [$p_k$ ($r*N_{RAU}$ + 0), ..., $p_k$ ($r*N_{RAU}$ + $N_{RAU}$ −1)] from DMEM to R_VIND, where r = IND_PG |
| 4 | Set s = 0 |
| 5 | Copy/Move R_VIND[$s*N_{elem}$: $s*N_{elem}$ + $N_{elem}$ −1] to R_IND |
| 6 | Run VINX-MUX (for i = 0, 1, ..., $N_{elem}$ −1 ): <br> Define ELEM_OFF[i] = LS $b_1$ bits of R_IND[i] <br> Define PG_OFF[i] = MS $b_2$ bits of R_IND[i] <br> Generate signal EN[i] such that EN[i] = 1, if PG_OFF[i] = CURR_PG, and, EN[i] = 0, otherwise <br> Generate ADDR[i] = ELEM_OFF[i] as the address selector for the multiplexer <br> If EN[i] is 1, the MUX[i] selects element in R_IN[ELEM_OFF[i]], and writes it to R_OUT[i] <br> Set W = EN[$N_{elem}$ −1] |
| 7 | If W = 1 <br> Store R_OUT to DMEM (maintained by a store address pointer) <br> Clear: W = 0 <br> s = s + 1 <br> If S < $N_{RAU}/N_{elem}$, go to Step 5 <br> Update IND_PG = IND_PG + 1, and, go to step 3 |
| 8 | CURR_PG = CURR_PG + 1 |
| 9 | If CURR_PG ≤ LAST_PG <br> Load [x ($j*N_{elem}$ + 0), ..., x ($j*N_{elem}$ + $N_{elem}$ −1)] from DMEM to R_IN, where j = CURR_PG <br> Go to step 6 |
| 10 | DONE | index vectors ($p_k$) are assumed to be ordered (e.g., ascending or descending). The final data vector 506B stored in memory 108 will include K output vectors 630. The K output vectors ($y_1, y_2, \ldots, y_K$) 630 each contain M elements (e.g., 16-bit, 32-bit, 64-bit) based on input type and based on the selection indices 660. The MUX logic operates on the input data 622 from the input vector 610 to produce the data output vectors 630 such that $y_k[i]=x(p_k[i])$, where i=0, 1, . . . , M−1, and, k=0, 1, . . . , K−1. As indicated above, the indices are constrained to be either: (1) non-increasing (decreasing) such that $p_k[i] \leq p_k[i-1]$, for all i=1, 2, . . . , M−1, or (2) non-decreasing (increasing) such that $p_k[i] \geq p_k[i-1]$, for all i=1, 2, . . . , M−1.

For one example embodiment, a state machine can be implemented in logic to implement the embodiment 500. One example set of instructions for such a state machine is the set forth below. For this state machine, term "$N_{AU}$" represents the number of accelerators 504 or complex arithmetic units (AUs) used for the vector processing. The term "$N_{RAU}$" represents $N_{AU}*4$. The term "$N_{elem}$" represents the number of data elements per line stored in data memory (DMEM). For 16-bit data, $N_{elem}=N_{AU}*4$. For 32-bit data, $N_{elem}=N_{AU}*2$. For 64-bit data, $N_{elem}=N_{AU}$ for 64 bit data. The register "R_IN" represents a vector input register that can hold $N_{elem}$ elements from the data input vector 610. The register "R_VIND" represents a vector index register that can hold $N_{RAU}$ selection indices 660. The register "R_IND" represents an index register that can hold $N_{elem}$ indices. A For the example state machine in the TABLE above, the first $N_{elem}$ elements of the input vector (x) is loaded in one DMEM line per cycle. Next, the first $N_{elem}$ indices from index vector ($p_k$) is loaded one DMEM line per cycle. An intermediate output buffer can be maintained having a size of one DMEM line. As the input vector (x) is loaded one DMEM line at a time, elements from the input vector (x) are copied to locations in the output buffer corresponding to the first subset of indices until the output buffer is full as indicated by register 640. Once the output buffer is full, the contents of the output buffer are stored memory. The process then restarts with an empty output vector (to be eventually appended to the previously stored output vector), and the "next" segment of indices. Data loads are continued. Because the indices are constrained to be non-decreasing or non-increasing, there is no need to "look back" at previously loaded data, and one sequence of loads covering the entire input vector (x) will populate the output vector in its entirety.

As described herein, a variety of embodiments can be implemented and different features and variations can be implemented, as desired.

For one embodiment, a radar system is disclosed including front-end circuitry, FFT circuits, and a processor. The front-end circuitry is coupled to transmit radar signals, to receive return radar signals, and to output digital radar data. The FFT circuits are coupled to receive the digital radar data and to output interpolated FFT data based upon pixel ranges and oversampled pixel range values, and the FFT circuits include a vector processor engine and an accelerator coupled to the vector processor engine. The vector processor engine is configured to provide parallel processing of the digital radar data, and the accelerator is configured to select data elements to be processed. The processor is coupled to receive the FFT data and to output radar pixel data representing a radar image. In further embodiments, the vector processor engine includes a single-instruction multiple data (SIMD) processor.

In additional embodiments, the accelerator includes logic programmed to select an arbitrary subset of data elements from an input vector of data elements based upon a user-configured and ordered vector of selection indices to generate a continuous output vector comprising the subset. In further embodiments, the accelerator comprises a plurality of multiplexers. In still further embodiments, the selection indices are used to generate address offsets and page offsets to control the plurality of multiplexers.

In additional embodiments, the radar system includes an output buffer configured to hold data for the output vector. In further embodiments, the radar system includes a register coupled to receive an enable signal associated with a most significant multiplex operation, and the register is configured to indicate when the output buffer is full.

For one embodiment, a circuit assembly is disclosed including FFT circuits and a processor. The FFT circuits are coupled to receive the digital radar data and to interpolated FFT data based upon pixel ranges and oversampled pixel range values, and the FFT circuits include a vector processor engine and an accelerator coupled to the vector processor engine. The vector processor engine is configured to provide parallel processing of the digital radar data, and the accelerator is configured to select data elements to be processed. The processor is coupled to receive the FFT data and to output radar pixel data representing a radar image. In further embodiments, the vector processor engine includes a single-instruction multiple data (SIMD) processor.

In additional embodiments, the accelerator includes logic programmed to select an arbitrary subset of data elements from an input vector of data elements based upon a user-configured and ordered vector of selection indices to generate a continuous output vector comprising the subset. In further embodiments, the accelerator comprises a plurality of multiplexers. In still further embodiments, the selection indices are used to generate address offsets and page offsets to control the plurality of multiplexers.

In additional embodiments, the circuit assembly includes an output buffer configured to hold data for the output vector. In still further embodiments, the circuit assembly includes a register coupled to receive an enable signal associated with a most significant multiplex operation, and the register is configured to indicate when the output buffer is full.

For one embodiment, a method to generate a radar image is disclosed including transmitting radar signals, receiving return radar signals, converting the return radar signals to digital radar data, processing the digital radar data with FFT circuits to output interpolated FFT data based upon pixel ranges and oversampled pixel range values, and outputting radar pixel data representing a radar image based upon the FFT data. The processing further includes parallel processing the radar data with a vector processor engine and selecting data elements to be processed by the vector processor engine with an accelerator. In further embodiments, issuing single instructions with the vector processor engine that return multiple data outputs.

In additional embodiments, the method includes, with the accelerator, selecting an arbitrary subset of data elements from an input vector of data elements based upon a user-configured and ordered vector of selection indices to generate a continuous output vector comprising the subset. In further embodiments, the accelerator comprises a plurality of multiplexers. In still further embodiments, the method includes generating address offsets and page offsets using the selection indices and controlling the plurality of multiplexers with the address offsets and page offsets.

In additional embodiments, the method includes holding data for the output vector in an output buffer. In further embodiments, the method includes storing an enable signal associated with a most significant multiplex operation in a register and indicating that an output buffer is full when the enable signal is asserted.

It is further noted that the functional blocks, components, systems, devices, or circuitry described herein can be implemented using hardware, software, or a combination of hardware and software along with analog circuitry as needed. For example, the disclosed embodiments can be implemented using one or more integrated circuits that are programmed to perform the functions, tasks, methods, actions, or other operational features described herein for the disclosed embodiments. The one or more integrated circuits can include, for example, one or more processors or configurable logic devices (CLDs) or a combination thereof. The one or more processors can be, for example, one or more central processing units (CPUs), control circuits, microcontroller, microprocessors, hardware accelerators, ASICs (application specific integrated circuit), or other integrated processing devices. The one or more CLDs can be, for example, one or more CPLDs (complex programmable logic devices), FPGAs (field programmable gate arrays), PLAs (programmable logic array), reconfigurable logic circuits, or other integrated logic devices. Further, the integrated circuits, including the one or more processors, can be programmed to execute software, firmware, code, or other program instructions that are embodied in one or more non-transitory tangible computer-readable mediums to perform the functions, tasks, methods, actions, or other operational features described herein for the disclosed embodiments. The integrated circuits, including the one or more CLDs, can also be programmed using logic code, logic definitions, hardware description languages, configuration files, or other logic instructions that are embodied in one or more non-transitory tangible computer-readable mediums to perform the functions, tasks, methods, actions, or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, or any other non-transitory tangible computer-readable mediums. Other variations can also be implemented while still taking advantage of the techniques described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A radar system, comprising:
front-end circuitry coupled to transmit radar signals, to receive return radar signals, and to output digital radar data;
FFT circuits coupled to receive the digital radar data and to output interpolated FFT data based upon pixel ranges and oversampled pixel range values, the FFT circuits comprising a vector processor engine and an accelerator coupled to the vector processor engine, wherein the vector processor engine is configured to provide parallel processing of the digital radar data and the accelerator is configured to select data elements to be processed; and
a processor coupled to receive the FFT data and to output radar pixel data representing a radar image,
wherein the accelerator comprises logic programmed to select an arbitrary subset of data elements from an input vector of data elements based upon a user-configured and ordered vector of selection indices to generate a continuous output vector comprising the subset.

2. The radar system of claim 1, wherein the vector processor engine comprises a single-instruction multiple data (SIMD) processor.

3. The radar system of claim 1, wherein the accelerator comprises a plurality of multiplexers.

4. The radar system of claim 3, wherein the selection indices are used to generate address offsets and page offsets to control the plurality of multiplexers.

5. The radar system of claim 3, further comprising an output buffer configured to hold data for the output vector.

6. The radar system of claim 5, further comprising a register coupled to receive an enable signal associated with a most significant multiplex operation, the register indicating when the output buffer is full.

7. A circuit assembly, comprising
FFT circuits coupled to receive the digital radar data and to interpolated FFT data based upon pixel ranges and oversampled pixel range values, the FFT circuits comprising a vector processor engine and an accelerator coupled to the vector processor engine, wherein the vector processor engine is configured to provide parallel processing of the digital radar data and the accelerator is configured to select data elements to be processed; and
a processor coupled to receive the FFT data and to output radar pixel data representing a radar image,
wherein the accelerator comprises logic programmed to select an arbitrary subset of data elements from an input vector of data elements based upon a user-configured and ordered vector of selection indices to generate a continuous output vector comprising the subset.

8. The circuit assembly of claim 7, wherein the vector processor engine comprises a single-instruction multiple data (SIMD) processor.

9. The circuit assembly of claim 7, wherein the accelerator comprises a plurality of multiplexers.

10. The circuit assembly of claim 9, wherein the selection indices are used to generate address offsets and page offsets to control the plurality of multiplexers.

11. The circuit assembly of claim 9, further comprising:
an output buffer configured to hold data for the output vector; and
a register coupled to receive an enable signal associated with a most significant multiplex operation, the register indicating when the output buffer is full.

12. A method to generate a radar image, comprising:
transmitting radar signals;
receiving return radar signals;
converting the return radar signals to digital radar data;
processing, with FFT circuits, the digital radar data to output interpolated FFT data based upon pixel ranges and oversampled pixel range values, the processing including parallel processing with a vector processor engine and selecting data elements to be processed by the vector processor engine with an accelerator;
outputting radar pixel data representing a radar image based upon the FFT data; and
with the accelerator, selecting an arbitrary subset of data elements from an input vector of data elements based upon a user-configured and ordered vector of selection indices to generate a continuous output vector comprising the subset.

13. The method of claim 12, further comprising, with the vector processor engine, issuing single instructions that return multiple data outputs.

14. The method of claim 12, wherein the accelerator comprises a plurality of multiplexers.

15. The method of claim 14, further comprising generating address offsets and page offsets using the selection indices and controlling the plurality of multiplexers with the address offsets and page offsets.

16. The method of claim 14, further comprising holding data for the output vector in an output buffer.

17. The method of claim 16, further comprising storing an enable signal associated with a most significant multiplex operation in a register and indicating that an output buffer is full when the enable signal is asserted.

* * * * *